United States Patent [19]
Cox et al.

[11] Patent Number: 5,140,686
[45] Date of Patent: Aug. 18, 1992

[54] DIAGNOSTIC SYSTEM FOR TEXTILE DYEING APPARATUS

[75] Inventors: Steven W. Cox, Chesnee; Harold L. Johnson, Jr., Pauline, both of S.C.

[73] Assignee: Milliken Research Corporation, Spartanburg, S.C.

[21] Appl. No.: 487,551

[22] Filed: Mar. 2, 1990

[51] Int. Cl.[5] .............................................. G06F 15/46
[52] U.S. Cl. ..................................... 364/470; 371/15.1
[58] Field of Search ................ 364/469, 470, 184–187; 68/205 R; 239/426; 8/149, 151, 158; 118/697, 699; 427/288; 112/80.23, 80.3; 371/15.1, 22.6

[56] References Cited
U.S. PATENT DOCUMENTS

| | | | |
|---|---|---|---|
| 3,901,273 | 8/1975 | Brouwer et al. | 137/557 X |
| 4,913,557 | 4/1990 | Segawa et al. | 371/15.1 X |
| 4,926,425 | 5/1990 | Hedtke et al. | 371/22.6 |
| 4,956,818 | 11/1990 | Hatayama et al. | 371/22.6 X |

*Primary Examiner*—Joseph Ruggiero
*Attorney, Agent, or Firm*—Kevin M. Kercher; H. William Petry

[57] ABSTRACT

A diagnostic system checks the major hardware components in a pattern control system used in a textile dyeing apparatus. The system includes bypass logic circuitry which permits selective bypassing of either the look-up tables, stagger memories, or both the look-up tables and the stagger memories in the pattern control system. The diagnostic system checks the look-up tables in the pattern control system to assure that the address lines for the look-up tables operate properly. A prime number pattern is loaded into the look-up tables such that each address location for each look-up table will have a different piece of data. The look-up tables are then read in address sequence and the output thereof compared with a previously stored prime number pattern to determine whether any errors arose. The system further checks the firing times produced by the gatling memory section of the pattern control system by simulating a machine speedup and checking for the onset of machine optimum speed and machine overspeed.

7 Claims, 13 Drawing Sheets

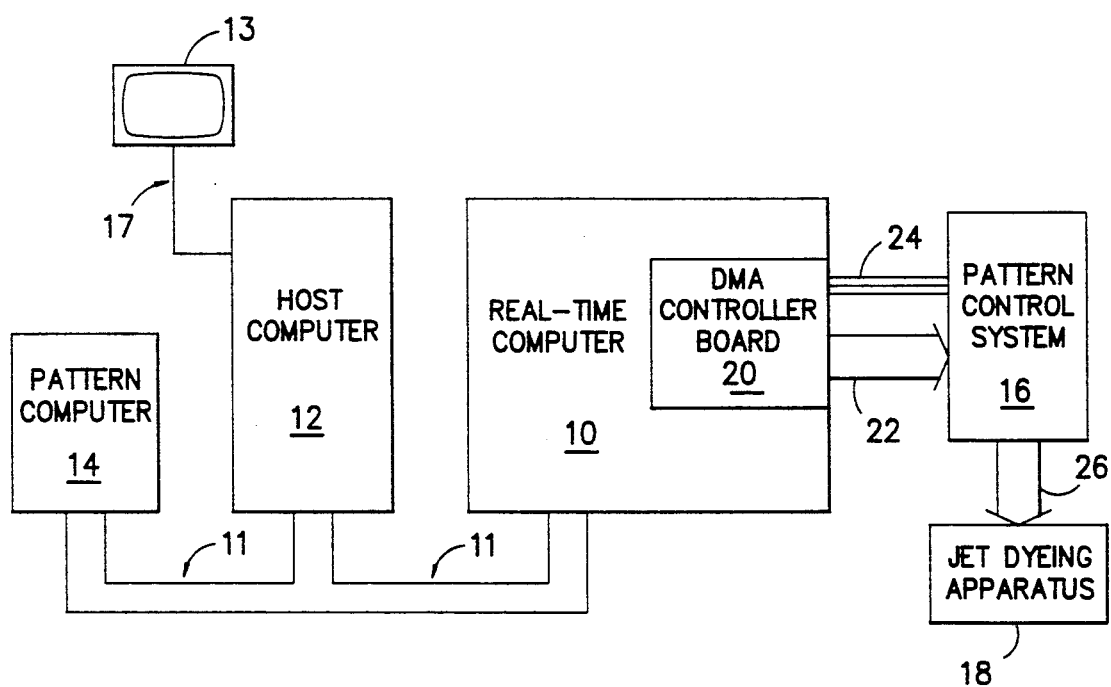
FIG. −1−

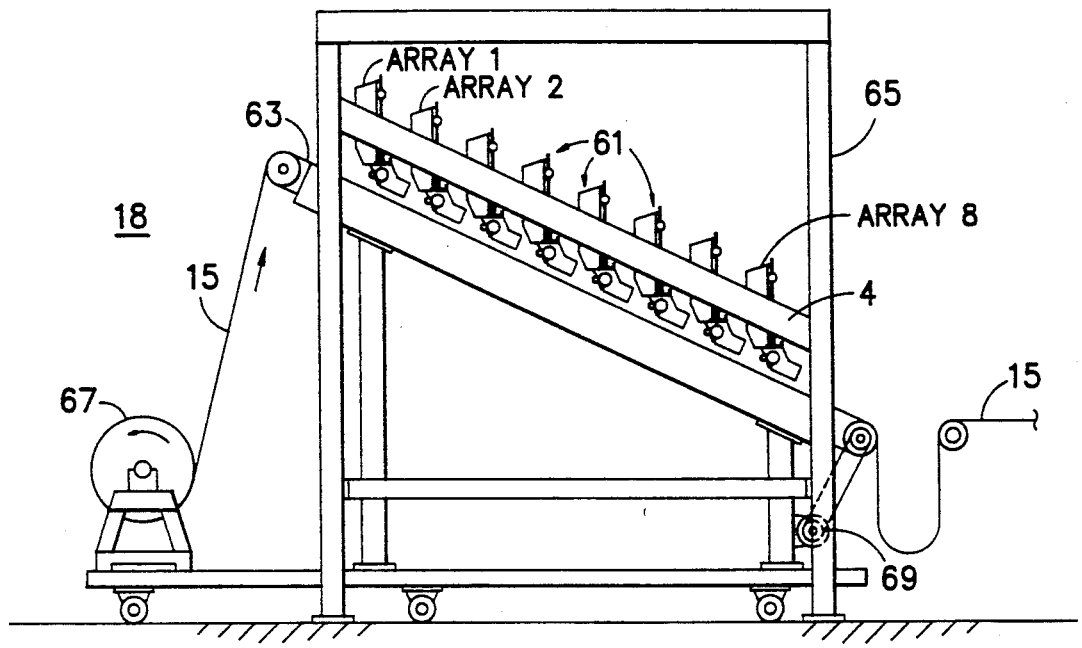
FIG. -2-
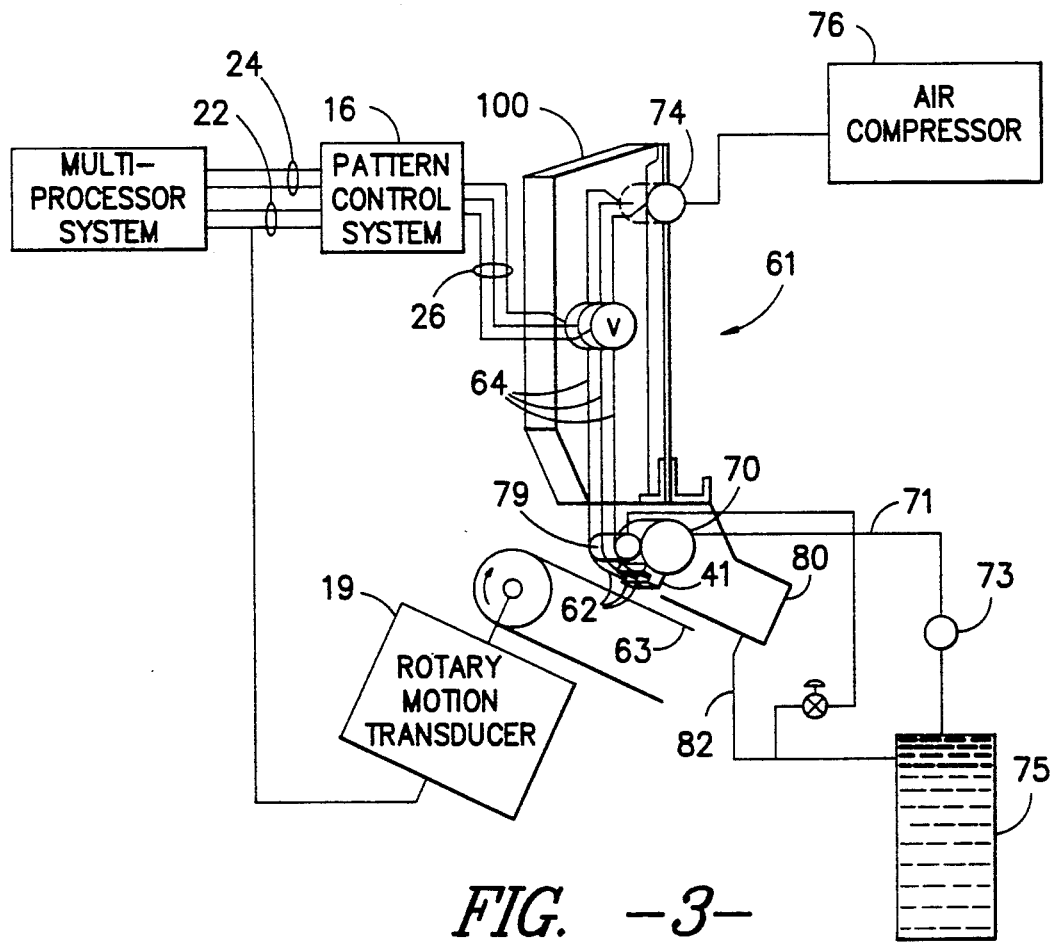
FIG. -3-

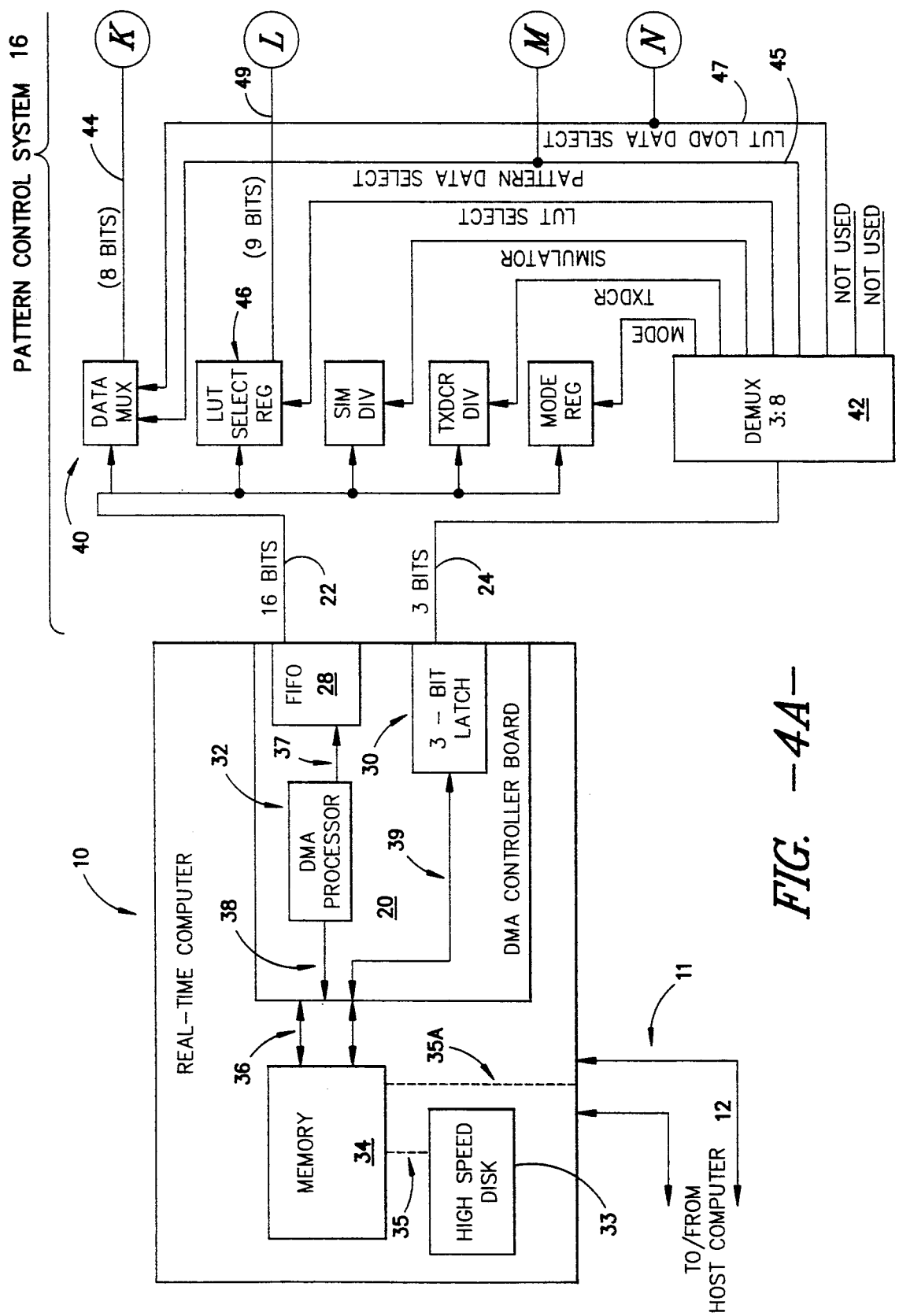
FIG. -4A-

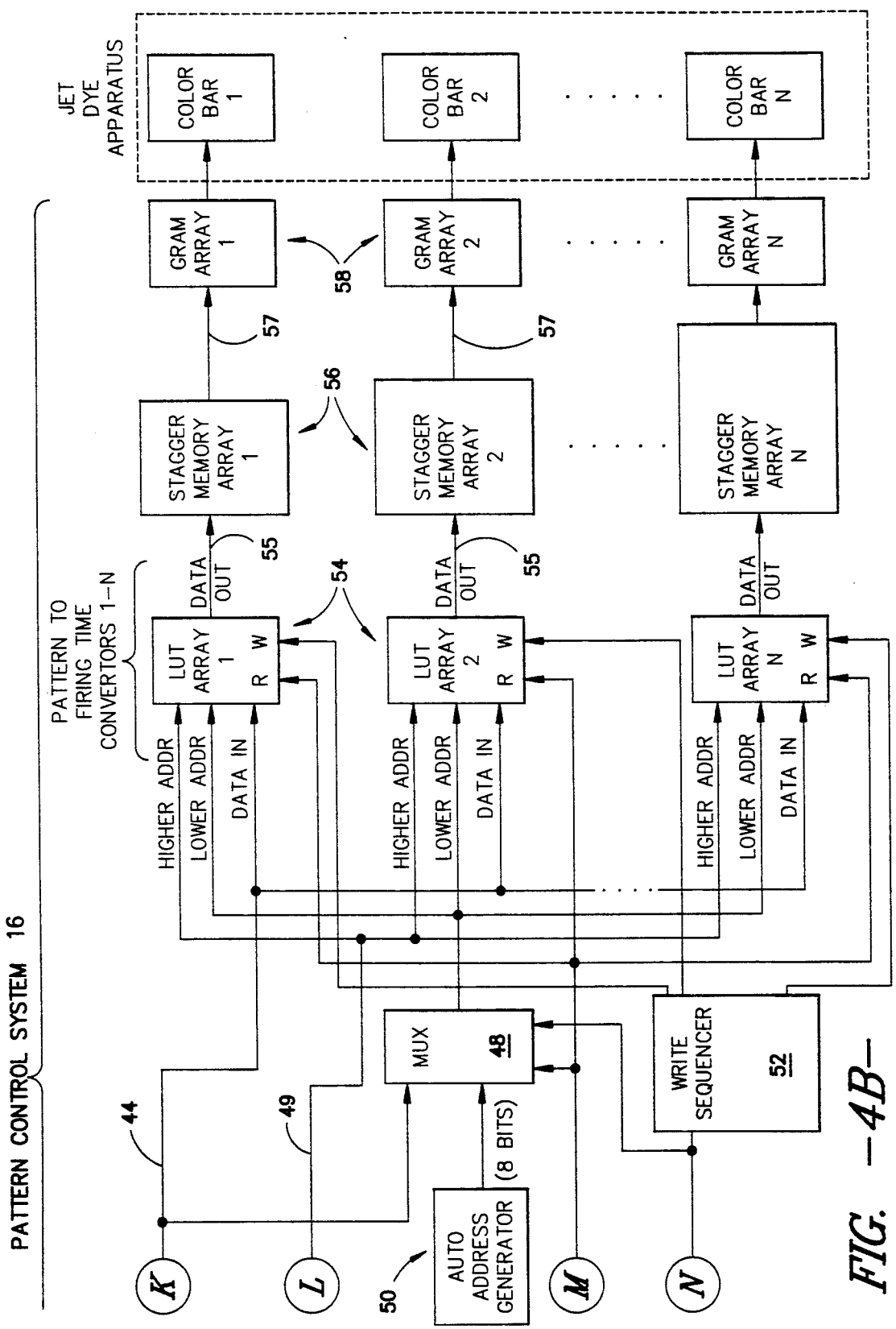
FIG. −4B−

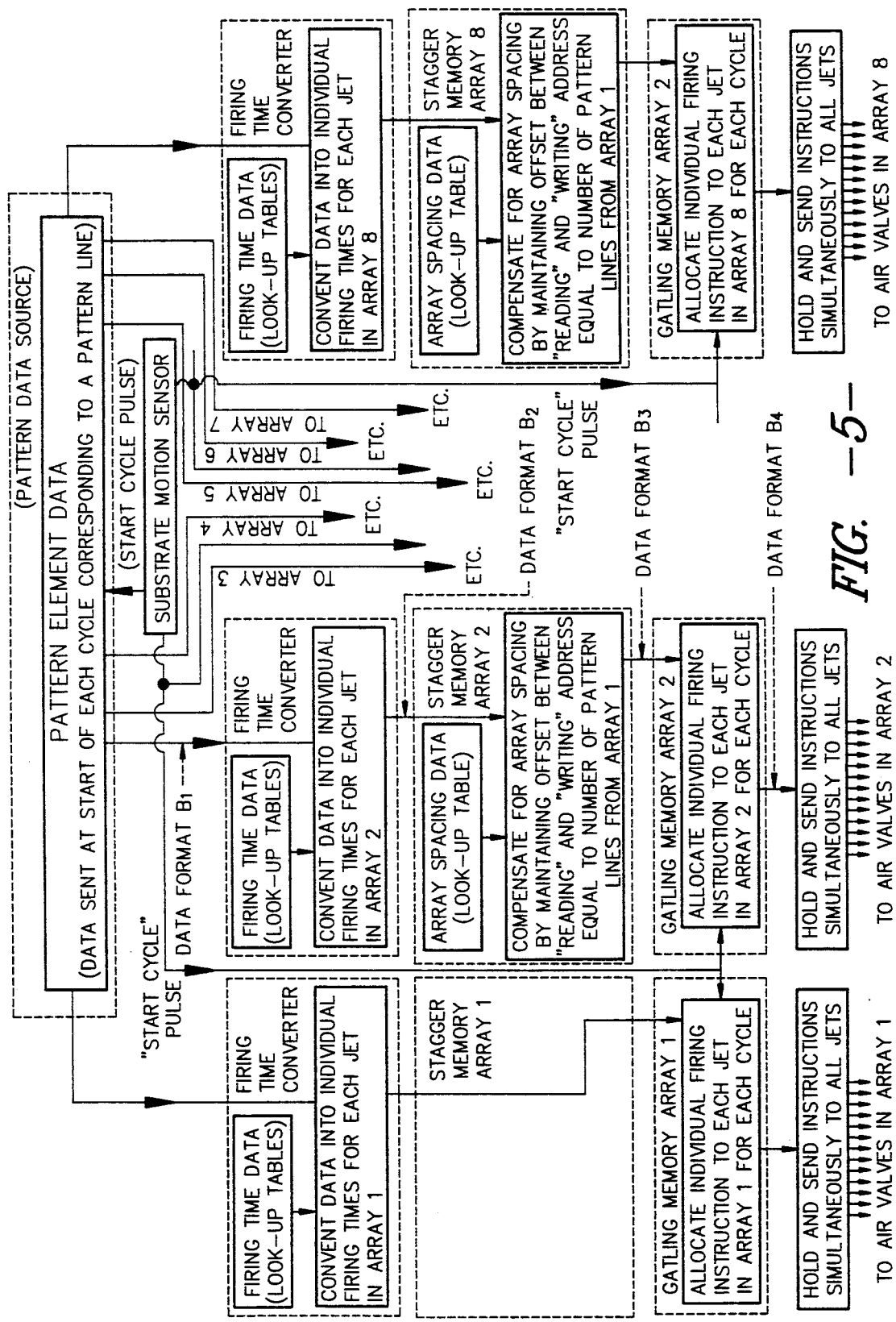
FIG. -5-

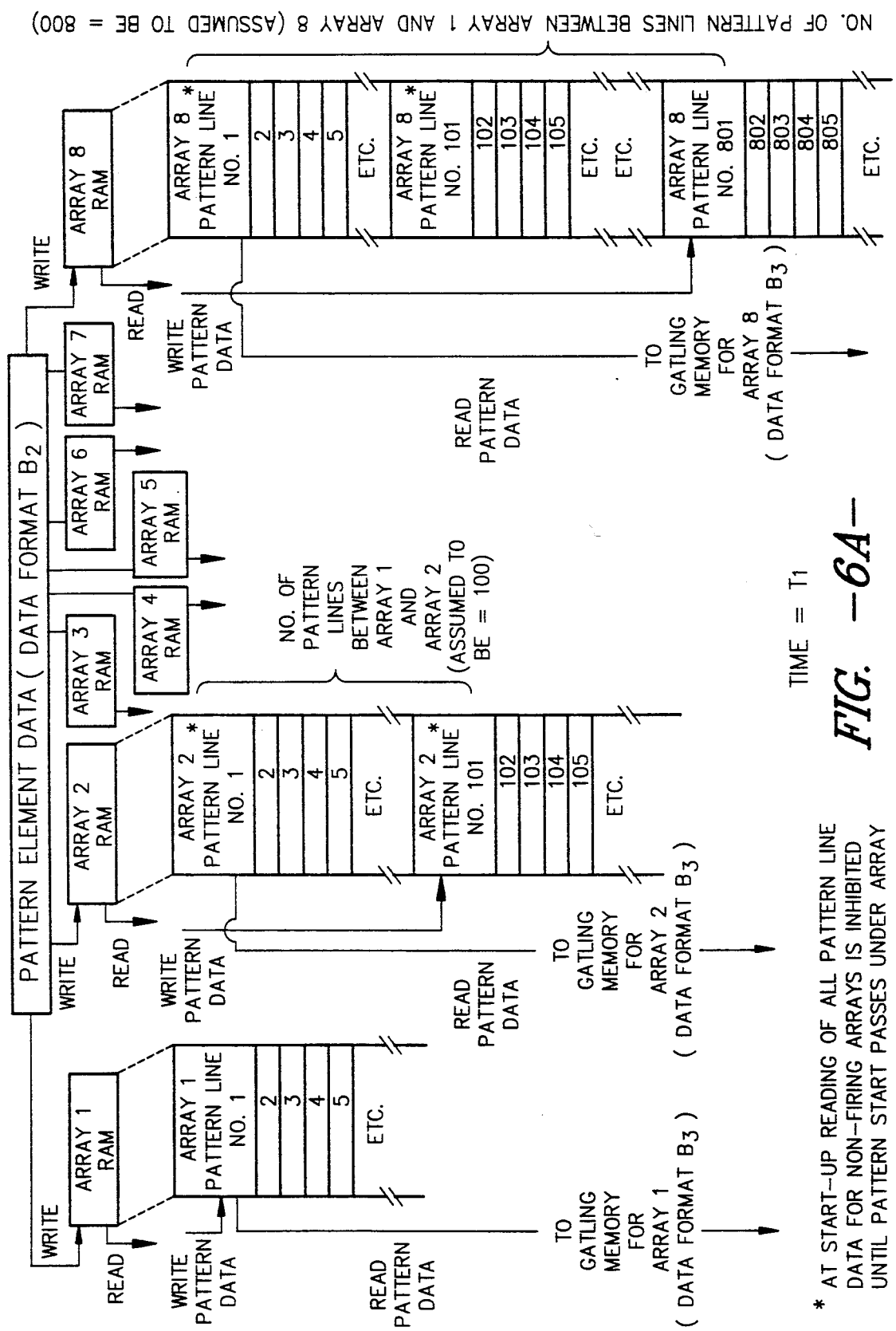

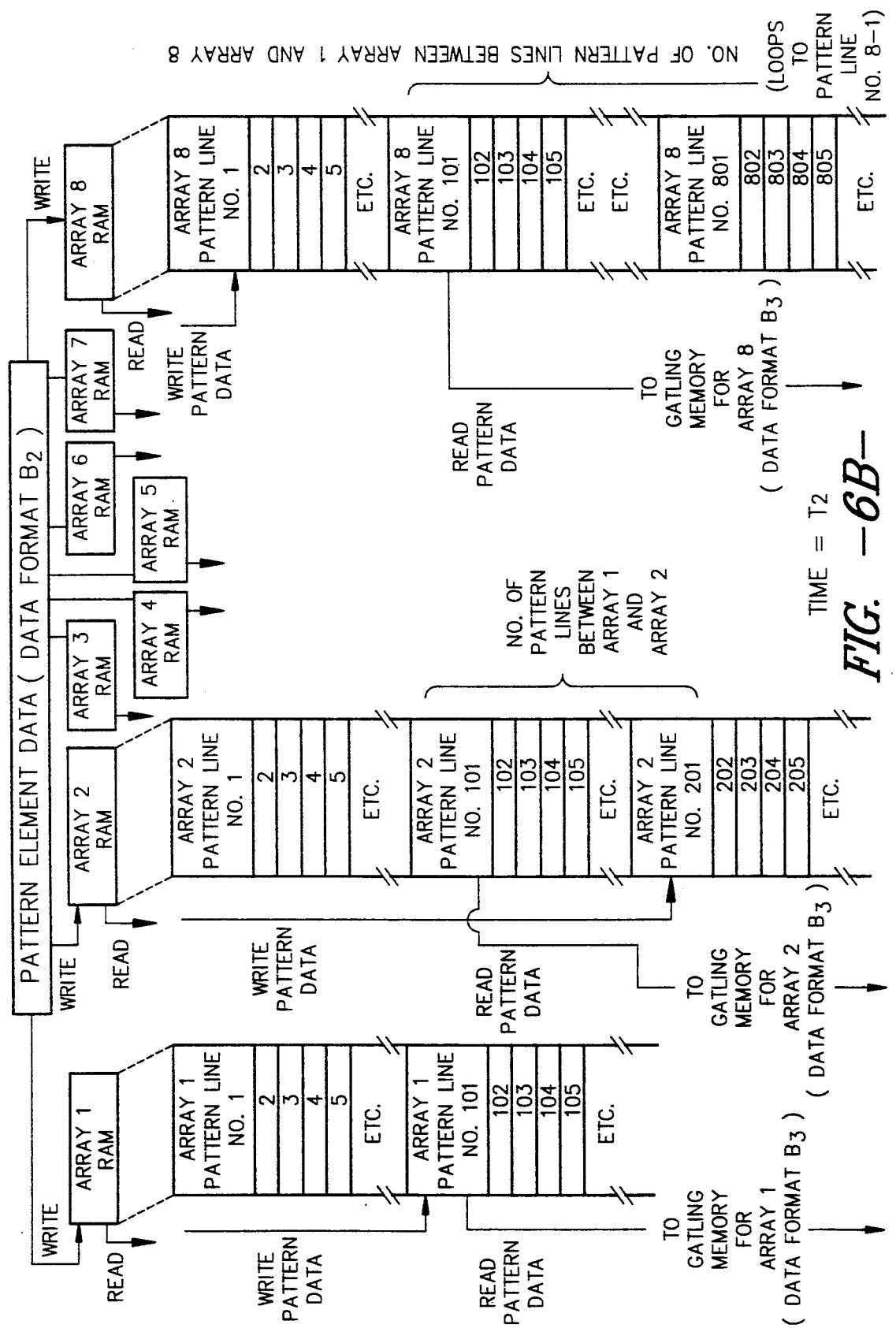
FIG. -6B-

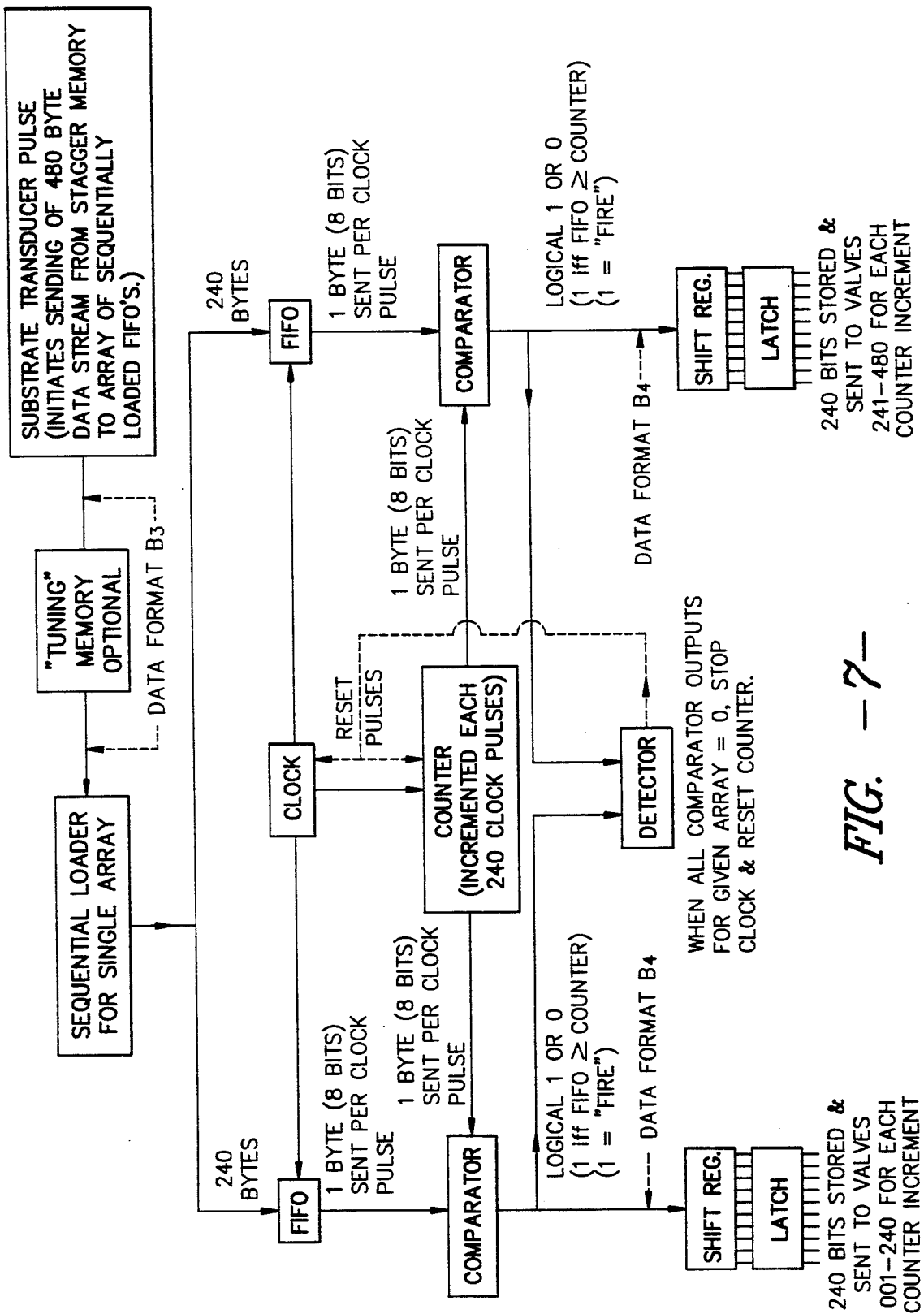
FIG. -7-

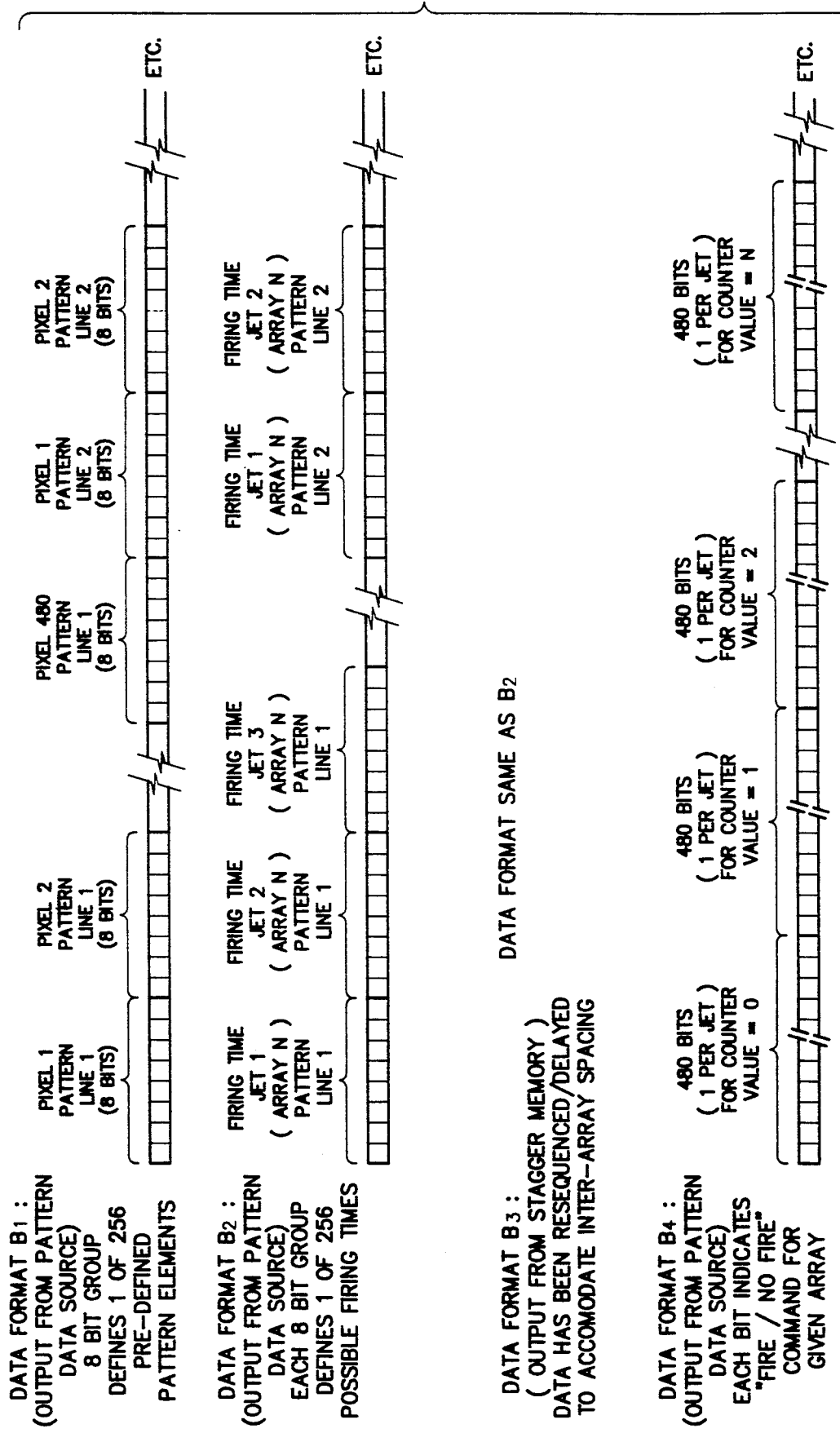
FIG. -8-

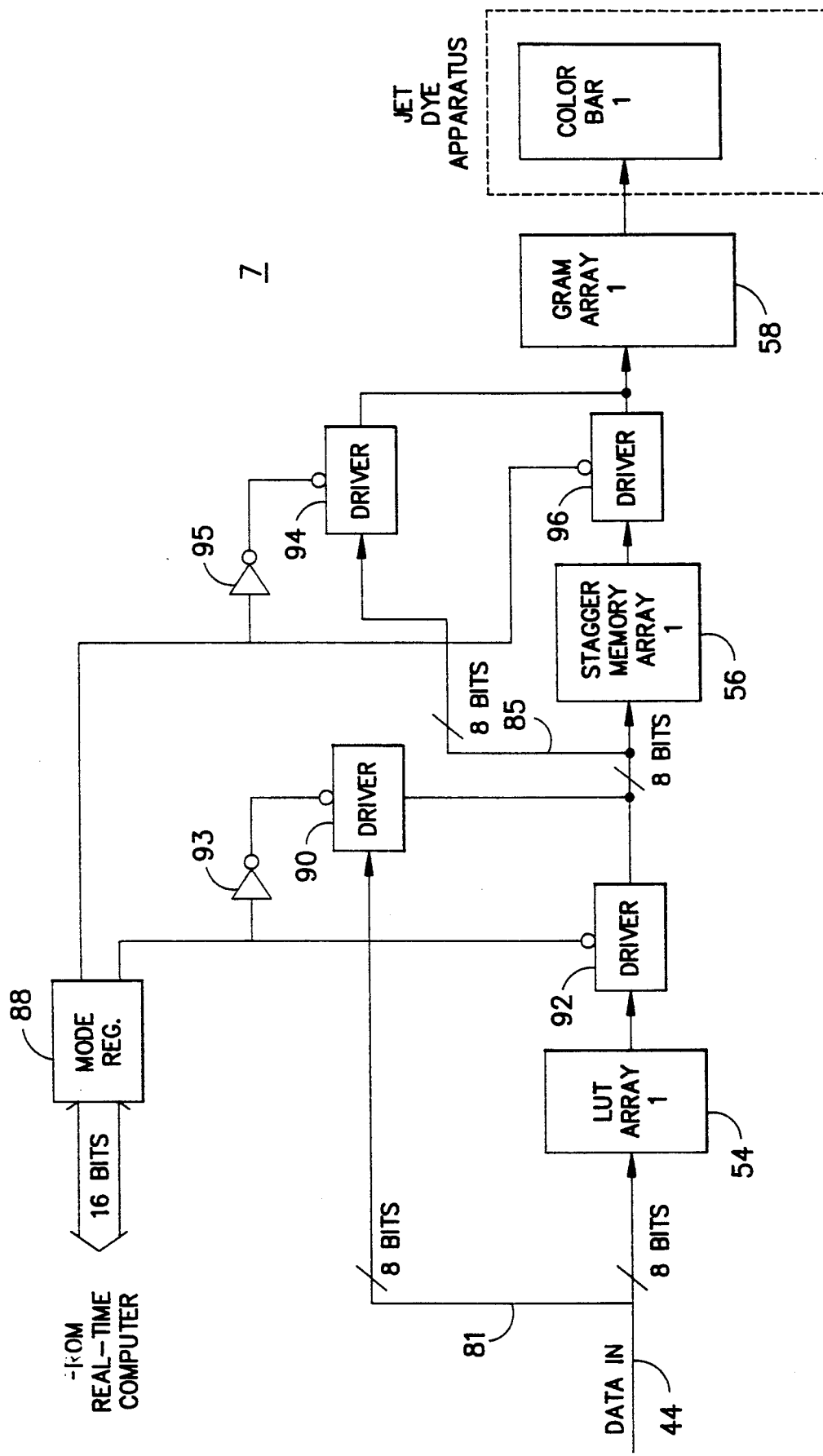
FIG. —9—

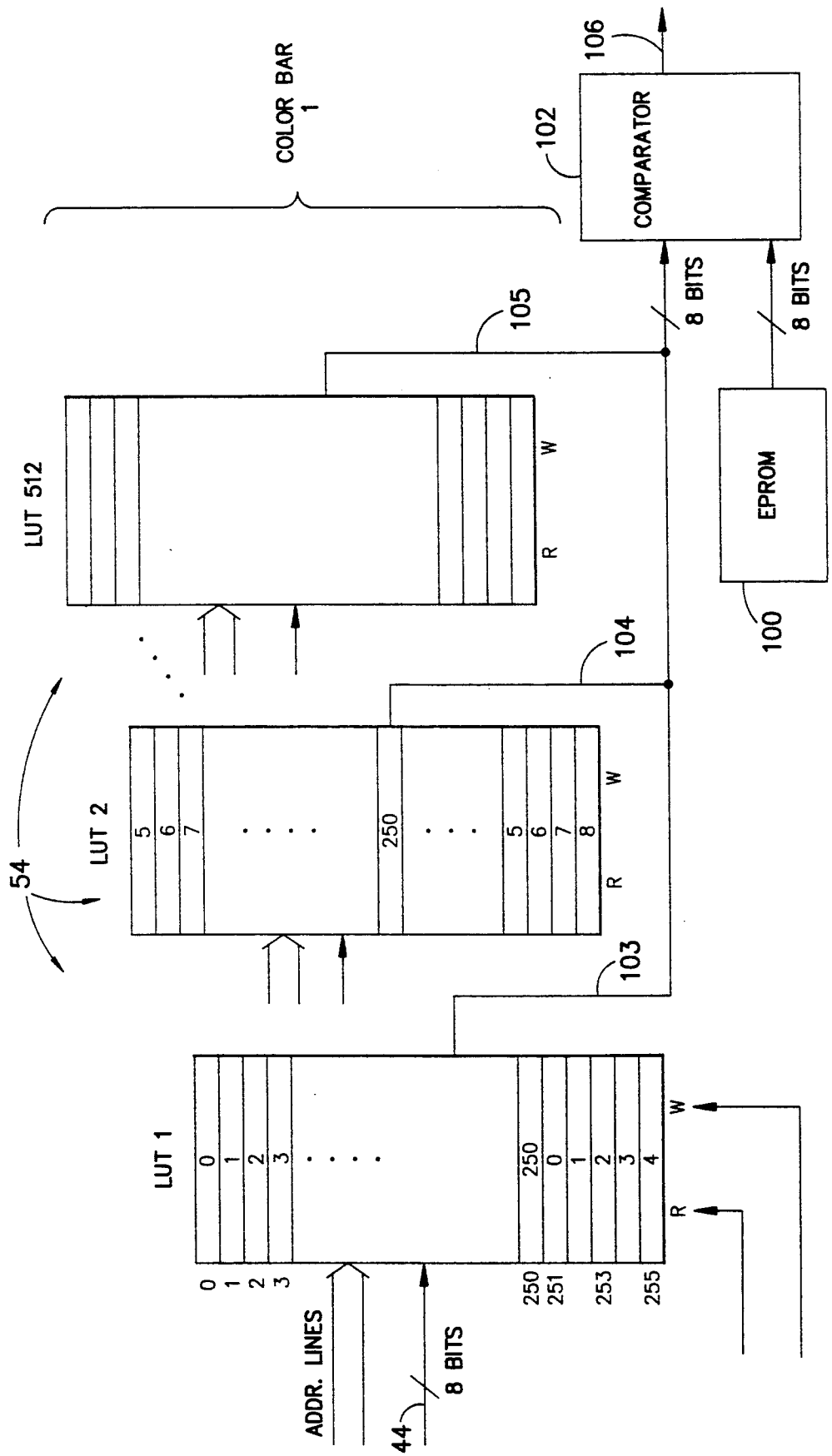
FIG. -10-

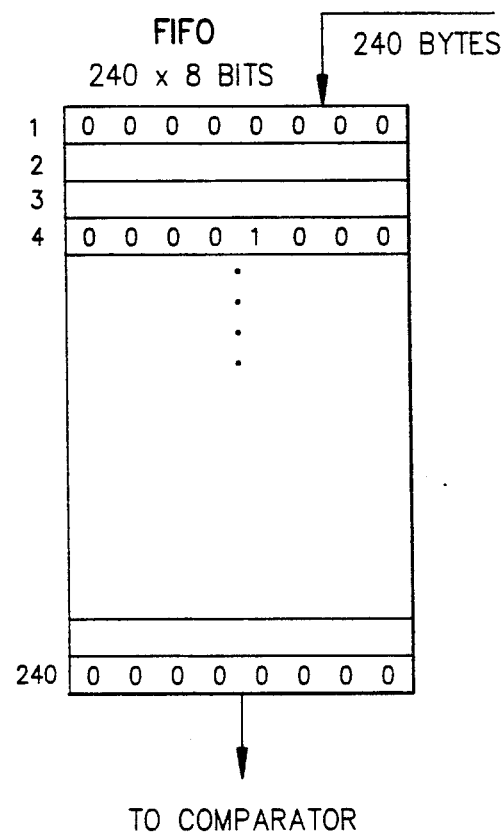
FIG. -11-
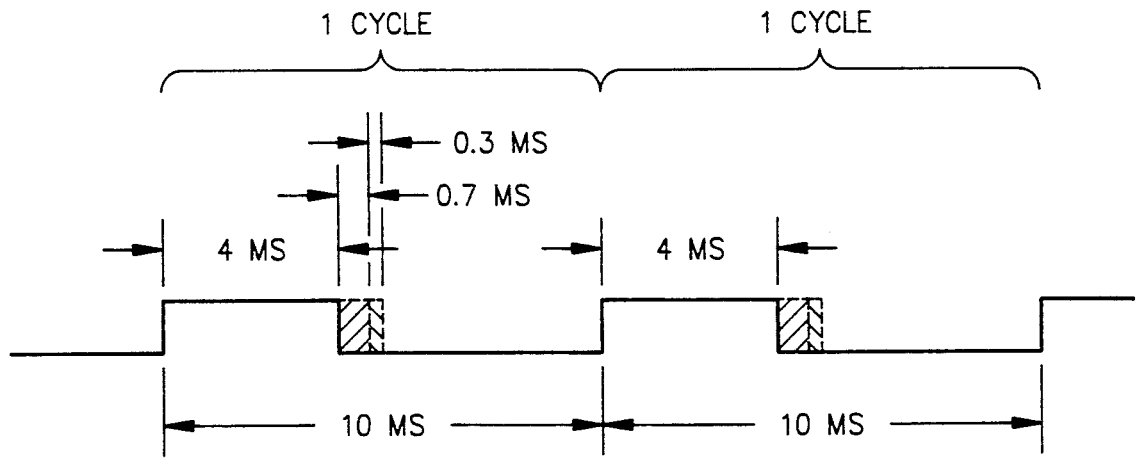
FIG. -12A-

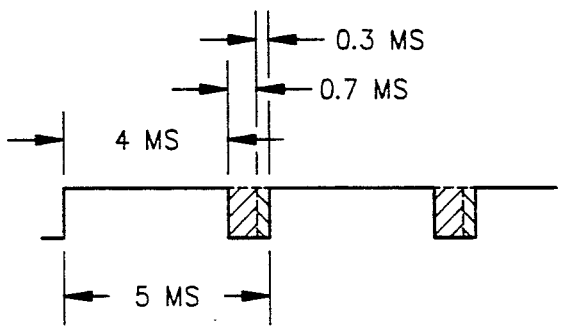
FIG. −12B−
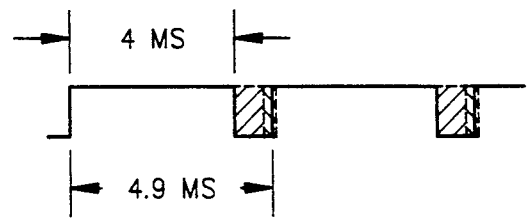
FIG. −12C−
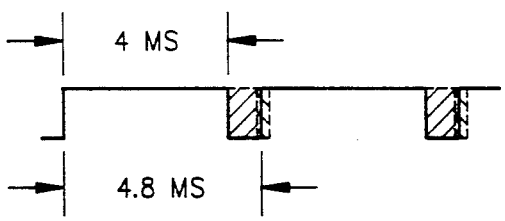
FIG. −12D−
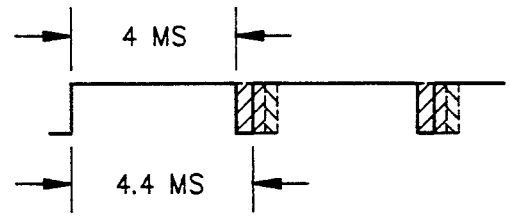
FIG. −12E−

DIAGNOSTIC SYSTEM FOR TEXTILE DYEING APPARATUS

FIELD OF THE INVENTION

This invention relates to a textile dyeing apparatus and, more particularly, to a diagnostic system for the textile dyeing apparatus which detects and isolates errors in the apparatus control system.

BACKGROUND OF THE INVENTION

A known modern textile dyeing apparatus includes multiple arrays or color bars, each comprising a plurality of individual, electronically addressable dye jets. Each of the dye jets in a single array outputs the same color of dye. The arrays are positioned in spaced relation across the path of a moving substrate.

Using such apparatus, the pattern-wise application of dye to the textile materials or substrates requires a large quantity of digitally encoded pattern data which must be sorted and routed to each of the individual dye jets comprising each of the arrays. Each of the arrays of dye jets extends across the width of the substrate path as the substrate moves under the arrays. The time period during which the dye streams produced by the individual dye jets in a given array are allowed to strike the substrate are individually controlled. This allows for shade variations to be produced from side-to-side (and end-to-end) on the substrate by varying the quantity of dye applied to the substrate along the length of a given array.

One such control system capable of providing this capability is described in co-pending U.S. Ser. No. 327,843, entitled "DATA LOADING AND DISTRIBUTING PROCESS AND APPARATUS FOR CONTROL OF A PATTERNING PROCESS", filed on Mar. 23, 1989, now U.S. Pat. No. 4,984,169 the specification of which is hereby incorporated by reference. This system processes pattern data received from a real-time processor through the use of specific electronic circuitry which accepts the pattern data in the form of a series of 8-bit units. Each of the 8-bit units or pixel codes uniquely identifies, for each pattern element or pixel, a pattern design element to be associated with that pattern element or pixel.

The term "pattern element" as used herein is intended to be analogous to the term "pixel" as that term is used in the field of electronic imaging. The number of different pattern design elements is equal to the number of distinct areas of the pattern which may be assigned a separate color.

The term "pattern line" as used herein is intended to describe a continuous line of single pattern elements extending across the substrate, parallel to the patterning arrays. Such pattern lines have a thickness, measured in the direction of substrate travel, equal to the maximum permitted amount of substrate travel under the patterning arrays between array pattern data updates.

In this control system, the pixel codes must first be converted to "on/off" firing instructions, (referring to the actuation or deactuation, respectively, of the individual dye streams produced by the dye jets). This is performed by electronically associating the "raw" pixel codes with pre-generated firing instruction data from a computer generated look-up table. The pixel codes merely define those distinct areas of the pattern which may be assigned a distinguishing color. Each code specifies, for each pattern line, the dye jet response for a given dye jet position on each and every array. In this system the number of arrays equal eight; therefore, each pixel code controls the response of eight separate dye jets (one per array) with respect to a single pattern line.

The pixel codes for a given array is preferably arranged in sequence, with data for dye jets 1-N for the first pattern line being first in the series, followed by data for dye jets 1-N for the second pattern line, etc. The complete serial stream of such pixel codes is sent to a firing time converter and memory associated with each respective array for conversion of the pixel codes into the respective firing times.

Each firing time converter includes a look-up table having a sufficient number of addresses so that each possible address code forming the serial stream of pattern data may be assigned a unique address in the look-up table. At each address within the look-up table is a byte representing a relative firing time or dye contact time, which, assuming an 8-bit value at the address code of interest, can be zero or one of 255 different discrete time values corresponding to the relative amount of time the dye jet in question is to remain "on". Therefore, each specific dye jet location on each and every array can be assigned one of 256 different firing times.

The firing time data from the look-up table for each array is then further processed to account for the "stagger", e.g., the physical spacing between arrays, and the allocation of the individual firing instructions for each jet in the array. The process of sequencing the individual pattern line data to accommodate substrate travel time or stagger between adjacent arrays is performed through the use of array-specific Random Access Memories (RAMs), which are preferably of the static type. All pattern data for a specific array is loaded into a RAM individually associated with that array. The pattern data is in the form of a series of bytes, each byte specifying a desired firing time for a single applicator or jet comprising the array. The loading process is a coordinated one, with all jet firing time data being loaded into the respective RAMs at the same time and in the same relative order, i.e., all firing times corresponding to the first line of the pattern for all jets in each array is loaded in the appropriate RAM first, followed by all data corresponding to the second pattern line, etc. Each RAM is read using reading address offsets which effectively delay the reading of the data a sufficient amount of time to allow a specific area of the substrate to "catch up" to the corresponding pattern data for that specific area which will be sent to the next array along the substrate path.

At this time, the series of individual firing times expressed in byte form are transferred into a sequence of individual binary digit ("bit") groups. Each group in the sequence represents the value of its corresponding respective firing time by the relative number of binary digits of a predetermined logic value (e.g., logical "one" = "fire") which are sequentially "stacked" within each group. This transformation allows the firing times, expressed in byte form, to be expressed as a continuing sequence of individual firing commands (i.e., single bits) which may be recognized by the applicators.

Finally, the individual firing instructions for each jet in the array are loaded into a collection of First-In First-Out Memories (FIFOs). Each array is associated with an individual set of FIFOs. Each FIFO repeatedly sends its contents, one byte at a time and strictly in the order in which the bytes were originally loaded, to a comparator. The value of the byte, representinq a desired elapsed firing time of a single jet along the array, is compared with a clock value which has been initialized to provide a value representing the smallest increment of time for which control of any jet is desired. As a result of the comparison, a firing command in the form of a logical "one" or logical "zero", which signifies that the jet is to "fire" or "not fire", respectively, is generated and is forwarded to a shift register associated with the array, as well as to a detector. After all bytes (representing all jet locations along that array) have been sent and compared, the contents of the shift register are forwarded, in parallel, to the air valve assemblies along the array by way of a latch associated with the shift register. Thereafter, the counter value is incremented, the same contents of the FIFO are compared with the new counter value, and the contents of the shift register are again forwarded, in a parallel format and via a latch, to the air valve assemblies in the array.

At some counter value, all elapsed firing times read from the FIFOs will be less than or equal to that value of the counter. When this condition exists at every array, fresh data, representing a new pattern line, is forwarded from the RAM in response to a transducer pulse indicating the substrate has moved an amount equivalent to one pattern line. This fresh data is loaded into the FIFOs and a new series of iterative comparisons is initiated, using a re-initialized counter. This process is repeated until all pattern lines have been processed. If the pattern is to be repeated, the RAM re-initiates the above procedure by sending the first pattern line to the appropriate FIFO's.

The known control system thus includes a large number of hardware components, i.e., look-up tables, stagger memories, and FIFOs associated with each color bar in the apparatus, all of which must operate properly to insure that the source pattern data is correctly transformed and printed on the substrate. There is therefore needed a diagnostic system which can check the major components in the control system to determine whether it is operating properly. Because of the extremely large number of components to be checked, the diagnostic system must be able to operate quickly and efficiently.

SUMMARY OF THE INVENTION

The present invention provides an efficient diagnostic system capable of checking the major hardware components in the pattern control system such as the look-up tables, stagger memories, and FIFOs associated with each color bar in the apparatus.

The diagnostic system includes bypass logic circuitry which permits selective bypassing of either the look-up tables, stagger memory, or both the look-up tables and the stagger memories in the pattern control system. This allows test patterns provided by the diagnostic system to selectively bypass certain of the control system components to isolate the occurrence of any errors detected. Bypass lines around each component are fed to logic circuitry performing "OR" operation to enable either the bypassed data or normal data to pass through the logic to the rest of the system. The same logic circuitry is utilized with respect to each of the components. The enable signals are received from a register which is loaded in accordance with the diagnostic performed.

It is an advantage of the bypass circuitry to allow the isolation of any component from the rest of the system. Further, test pattern data can be provided directly to the gatling memory thus avoiding time delays inherent with the operation of the stagger memory. In normal day to day production operation, the bypass logic allows the checking of dye jets and flows without having to wait for the stagger memory to compensate for downstream color bars.

The present invention further provides for a diagnostic check of the look-up tables in the pattern control system. The diagnostic assures that the address lines for the look-up tables operate properly, i.e., the address lines are capable of correctly specifying each unique address within each single look-up table among a group of look-up tables. The look-up tables are loaded with a "prime number pattern" which is repeated to fill up each of the look-up tables for each of the color bars. A "count pattern" of addresses is then input to the look-up table from which a respective sequence of the prime number pattern is output. The output from the look-up tables is then compared with an identical copy of the prime number pattern to determine the coincidence of each pattern.

It is an advantage of the present invention to use a prime number pattern to load the look-up tables such that each address location for each look-up table will have a different piece of data. This ensures that any address lines causing incorrect addressing can be determined.

The present invention also provides for a diagnostic check of the firing times produced by the gatling memory section of the pattern control system. The diagnostic system simulates a machine speed-up, and then checks for the onset of machine "optimum speed" and machine "overspeed". These two machine conditions indicate whether the speed of the substrate traveling under the dye jets is approaching, or has exceeded, respectively, the maximum speed at which the individual valves controlling the application of dye on the substrate can operate. The detection of these machine conditions provides signals to the system such that the diagnostic is made aware of these conditions as they occur.

It is an advantage of the firing time diagnostic to assure that all of the hardware is operating properly.

Details of the present invention herein, as well as additional advantages and distinguishing features, will be better understood with reference to the following figures.

BRIEF DESCRIPTION OF THE DRAWINGS

FIG. 1 is a block diagram illustrating one pattern control system environment in which the present invention may operate;

FIG. 2 is a diagramatic side elevation view of a jet dyeing apparatus to which the present invention is particularly well adapted;

FIG. 3 is a schematic side elevation view of the apparatus of FIG. 2, showing only a single dye jet color bar and its operative connection to a liquid dye system as well as several electronic subsystems associated with the apparatus;

FIGS. 4A and 4B constitute a schematic block diagram illustrating in greater detail the real-time computer and pattern control system of FIG. 1;

FIG. 5 is a block diagram further disclosing the control system of the apparatus;

FIGS. 6A and 6B are diagramatic representations of the "stagger" memory disclosed in FIG. 5. FIG. 6A depicts a memory state at a time T1; FIG. 6B depicts a memory state at time T2, exactly 100 pattern lines later;

FIG. 7 is block diagram describing the "gatling" memory described in FIG. 5;

FIG. 8 schematically depicts the format of the pattern data at various data processing stages as indicated in FIGS. 5–7;

FIG. 9 is a schematic block diagram illustrating the diagnostic bypass logic;

FIG. 10 is a block diagram of the look-up tables in FIG. 4, illustrating the operation of the LUT diagnostic;

FIG. 11 is a block diagram of the FIFO register in the gatling memory section in FIGS. 4 and 5;

FIGS. 12A–12E are timing diagrams illustrating the operation of the FIFO diagnostic.

DETAILED DESCRIPTION SYSTEM OVERVIEW

Referring to FIG. 1, a multiprocessor patterning system 5 is shown having a host computer 12 coupled via a bus 11 to a real-time computer 10. Optional pattern computer 14 is further coupled to the host computer 12 and real-time computer 10 by the bus 11. It is readily apparent that the coupling of the pattern computer 14, host computer 12 and real-time computer 10 may be by any means for coupling a local area network (LAN) such as an Ethernet bus.

A pattern control system 16 is coupled via bus 26 to a jet dyeing apparatus 18. The jet dyeing apparatus 18 is described in greater detail in FIGS. 2 and 3. The pattern control system 16 receives inputs from bus 22 and channel select lines 24 of the programmable DMA controller board 20. The programmable DMA controller board 20 is part of the real-time computer 10 and is described in greater detail in FIG. 2.

Optional pattern computer 14 may be provided to allow a user of the system to quickly create their own pattern design. Alternatively, pattern designs may be pre-loaded onto magnetic or optical media (not shown) for reading into the system. A computer terminal 13 may be coupled via a suitable connection 17, e.g., a standard RS232 cable, to the host computer 12. The terminal 13 then serves as the operator's interface for providing the input parameters to the host computer for each "job" of patterns to be generated on the substrate by jet dyeing apparatus 18. The host computer 12 also fetches the pattern data from he pattern computer or other source and sets it up for processing by the real-time computer 10. The real-time computer 10 functions to insure that the pattern data is properly output to the pattern control system 16 by programming appropriately the DMA controller board 20.

Jet Dyeing Apparatus

FIG. 2 shows a jet dyeing apparatus 18 comprised of a set of eight individual color bars 61 positioned within frame 65. Each color bar 61 is comprised of a plurality of dye jets, perhaps several hundred in number, arranged in spaced alignment along the length of the color bar, which color bar extends across the width of substrate 15. Substrate 15, such as a textile fabric, is supplied from roll 67 as transported through frame 65 and thereby under each color bar 61 by conveyor 63 driven by a motor indicated generally at 69. After being transported under color bars 61, substrate 15 may be passed through other dyeing-related color steps such as drying, fixing, etc.

Referring to FIG. 3, there is shown in schematic form a side elevation of one color bar 61 comprising the jet dyeing apparatus 18 of FIG. 2. For each such color bar 61, a separate dye reservoir tank 75 supplies liquid dye under pressure by means of pump 73 and dye supply conduit means 71, to a primary dye manifold assembly 70 of the color bar 61. Primary manifold assembly 70 communicates with and supplies dye to dye sub-manifold assembly 41 at suitable locations along their respective lengths. Both manifold assembly 70 and sub-manifold assembly 41 extend across the width of conveyor 63 on which the substrate to be dyed is transported. Sub-manifold assembly 41 is provided with a plurality of spaced, generally downwardly directed dye passage outlets positioned across the width of conveyor 63 which produce a plurality of parallel dye streams which are directed onto the substrate surface to be patterned.

Positioned in alignment with and approximately perpendicular to each dye passage outlet (not shown) in sub-manifold assembly 41 is the outlet of an air deflection tube 62. Each tube 62 communicates by way of an air deflection conduit 64 with an individual electro-pneumatic valve, illustrated collectively at "V", which valve selectively interrupts the flow of air to air tube 62 in accordance with the pattern information supplied by pattern control system 16. Each valve is, in turn, connected by an air supply conduit to a pressurized air supply manifold 74 which is provided with pressurized air by air compressor 76. Each of the valves V, which may be, for example, of the electromagnetic solenoid type, are individually controlled by electrical signals received over bus 26 from the electronic pattern control system 16. The outlets of deflection tubes 62 direct streams of air which are aligned with and impinge against the continuously flowing streams of dye flowing from downwardly directed dye passages within sub-manifold 41 and deflect such streams into a primary collection chamber or trough 80, from which liquid dye is removed, by means of a suitable dye collection conduit 82, to dye reservoir tank 75 for recirculation.

The pattern control system 16 receives pattern data over bus 22 and control information over lines 24 from the multiprocessor system described in FIG. 1. The desired pattern information from control system 16 is transmitted to the solenoid valves of each color bar 61 at appropriate times in response to movement of the substrate under the color bars by conveyor 63, which movement is detected by a suitable rotary motion sensor or transducer means 19 operatively associated with the conveyor 63 and connected to control system 16.

Pattern Control System

Referring to FIG. 4, the real-time computer 10 is shown having memory 34 and programmable DMA controller board 20. Pattern data is received from the host computer 12 via the bus 11 and stored on high speed disk 33 by way of diagrammatically depicted links 35 and 35A, which typically may be comprised of an I/0 bus, associated bus interface units, and an appropriate network interface unit, not shown. As appropriate, data is moved from high speed disk 33 into memory 34, via link 35, for access by DMA controller 20 via bus 36.

The programmable DMA controller board 20 is shown comprising a programmable DMA processor 32, FIFO buffer 28 and 3-bit latch 30. The programmable DMA processor 32 couples with bus 36 via line 38 and with FIFO buffer 28 via line 37. Further, the 3-bit latch 30 is coupled to the bus 36 via line 39. It should be understood that FIG. 4 shows only a simplified diagrammatically depicted version of the programmable DMA controller board 20. A more complete and accurate description of the controller board 20 can be found by consulting the specifications thereof; for example, the controller board 20 may be of the type produced by Digital Equipment Corporation as Model DRQ3B or may be the Intel 82258 DMA chip used in conjunction with a host computer card such as the Intel 286/12 Board.

Pattern numbers chosen by the operator using terminal 13 are entered via line 17, into host computer 12 (FIG. 1). Computer 12 loads pattern data from, e.g., pattern computer 14, onto high speed disk 33, and then sends data messages to real-time computer 10. Computer 10, on receipt of such messages, loads the requested pattern data from high speed disk 33 into memory 34. When requested by means of an interrupt, as by the occurrence of a transducer pulse indicating a predetermined length of substrate has passed under the patterning jets, the real-time computer 10 commands the DMA controller 20 to initiate the transfer of the appropriate pattern data stored in memory 34 to the pattern control system 16, via FIFO buffer 28.

A first-in-first-out (FIFO) buffer 28 stores words (16-bits) of pattern data in each buffer location. The pattern data stored in FIFO buffer 28 is then output to the pattern control system 16 along the high-speed (e.g., 2.6 megabytes/second) data bus 22. The FIFO buffer 28 serves as an interface between the rate at which data is placed into the FIFO buffer 28 by DMA processor 32 and the rate at which data is output to the pattern control system 16. If the pattern control system 16 operates at a rate equal to or greater than that of the real-time processor 10, FIFO buffer 28 would not be needed to perform such interface function.

The DMA processor 32 also functions to request memory 34 to provide inputs via line 39 to the 3-bit latch 30 as real-time computer 10 commands it to do so. The latch 30 provides a parallel output on the three channel select lines 24 to the pattern control system 16.

The demultiplexer 42 receives the channel select lines 24 and provides one of eight outputs depending upon the state of the channel select lines 24. The demultiplexer 42 may be any suitable conventional 3-to-8 type demultiplexer.

A portion of the pattern control system 16 is shown in FIG. 4 having a 3:8 demultiplexer 42, a series of 16-bit registers, and a 16-to-8 bit data multiplexer 40. Multiplexer 40 receives the 16-bit words (when either the pattern data select line 34 or the LUT load data select line 47 is selected by the channel select lines 24, through demultiplexer 42) over data bus 22 from the FIFO buffer 28 in the programmable DMA controller board 20. The 16-bit multiplexer 40 then provides single byte (8 bit) write outputs over 8-bit bus 44. Therefore, the data multiplexer 40 serves to convert each 16-bit parallel word into a sequence of two bytes over 8-bit parallel bus 44 for pattern data or LUT load data. The bus 44 is further coupled in parallel with an array of N firing time converters (numbered 1 through N), each firing time converter corresponding to one of N arrays of individual dye jets. Each firing time converter 1 through N includes a plurality of look-up tables (LUT arrays 1 through N) addressed by the contents of the LUT select register 46 which provides the upper address lines to each firing time converter array. Each firing time convertor array may be thought of as a simple, high speed static memory having address lines, data-in lines, data-out lines, and read and write control lines.

The other four 16-bit registers, LUT SELECT REG 46, SIM DIV 84, TXDCR DIV 86 and MODE REG 88, can be loaded by selecting the appropriate register with the channel select lines and providing the desired value on 16-bit bus 22.

One of the four 16-bit regisers loaded by bus 22 is the MODE REGISTER 88. Each of the bits in the mode register specifies a type of operation for the control system. The value loaded into the mode register 88 enables the diagnostic checks performed by the system and described below.

Also shown in FIG. 4 is the bypass logic circuitry 7 associated with the LUT's and stagger memories for each color bar. This bypass circuitry receives signals generated from the MODE register 88 to activate the circuitry in accordance with the system software instructions from the real-time computer 10. The bypass circuitry is fully described below with respect to the diagnostic functions performed by the system.

Look-up Tables

Another of the four 16-bit registers loaded by bus 22 is the look-up table (LUT) select register 46. Nine bits from the LUT select register provide the upper nine address lines to each LUT array (1 through N), thus providing 512 LUTs for each respective array. For purposes of discussion, this embodiment is assumed to include 8 color bars (N=8) and, as mentioned above, 512 LUTs per color bar, however, it is understood that different numbers of color bars and LUTs may be used. Each look-up table has a sufficient number of addresses so that each possible address code forming the serial stream of pixel codes may be assigned a unique address in each of the look-up tables. At each address within the look-up table is a byte representing a relative firing time or dye contact time. Assuming an 8 bit address code used to form the raw pixel codes, the firing time can be zero or one of 255 different discrete time values corresponding to the relative amount of time the dye jet in question is to remain "on". Accordingly, for each 8 bit byte of pixel data, one of 256 different firing times (including a firing time of zero) is defined for each specific jet location on each and every color bar 1-N. Jet identity within a given array is determined by the relative position of the address code within the serial stream of pixel codes and by the information pre-loaded into the look-up table, which information specifies in which arrays a given jet position fires, and for what length of time.

The 8-bit bus 44 from Data MUX 40 is connected in parallel to the data inputs of the firing time converters. It is also connected to the input of MUX 48. Connected to the other input of MUX 48 is AUTO address generator 50. Depending on the state of channel select lines 24, one or the other of these inputs can be connected to the lower address lines of each LUT array. To load an array with firing time conversion data, select lines 24 activate the LUT load data select line 47. This "enables" DATA MUX 40, as well as connects AUTO address generator 50 through MUX 48 to the lower address lines of each LUT array in sequence, and provides a sequential "write enable" through sequence 52 to each LUT array such that all data though DATA MUX 40 sequentially loads the specific LUT within each LUT array selected by LUT select register 46 for each LUT array. (The first 256 bytes on bus 44 are loaded into LUT array 1; the second 256 bytes are loaded into LUT array 2, etc.) To output pattern data through the LUT's, select lines 24 activates the pattern data select line 45, which "enables" DATA MUX 40, routes data on bus 44 through MUX 48 to the lower address lines of each LUT array, and provides a "read enable" signal to each LUT array such that data from bus 44 selects the appropriate contents (i.e., firing time) of each LUT selected by the LUT select register 46. This firing time is output on its respective data out bus 55 to each stagger memory array 56. Thus, depending upon the output from channel select lines 24 of the programmable DMA controller 20, the enabling of one of the eight possible output lines from demultiplexer 42 directs where data from BUS 22 will go (i.e., to one of the 16 bit registers, or through MUX 48 to the data inputs of the LUT arrays, or channeled through MUX 48 to the lower address lines of each LUT array).

Stagger Memories

The firing time information from the LUT arrays comprising firing time converters 1-N is supplied to a respective stagger memory 56 for each of the LUT arrays 1-N. The stagger memories 56 1-N function to compensate for the time necessary for the substrate to be patterned to travel from color bar to color bar due to the physical spacing between the color bars in the jet dyeing apparatus. The stagger memory 56 operates on the firing time data produced by LUT arrays 54 and performs two principal functions: (1) the serial data stream from the LUT array, representing firing times, is grouped and allocated to the appropriate color bars on the patterning machine and (2) "non-operative" data is added to the respective pattern data for each array to inhibit, at start up and for a pre-determined interval which is specific to that particular color bar, the reading of the pattern data in order to compensate for the elapsed time during which the specific portion of the substrate to be patterned with that pattern data is moving from color bar to color bar.

Gatling Memories

The stagger memories 56 provide their output to a "gatling" memory module 58 for each color bar. The gatling memory 58 performs two principle functions: (1) the serial stream of encoded firing times is converted to individual strings of logical (i.e., "on" or "off") firing commands, the length of each respective "on" string reflecting the value of the corresponding encoded firing time, and (2) these commands are quickly and efficiently allocated to the appropriate dye jets. Thus, the gatling memory arrays serve to distribute the encoded firing times to the appropriate jets for each dye jet color bar such that the desired pattern is produced on the substrate moving under the dye jet color bars. The precise operation of the control system is given below with respect to FIGS. 5-8.

Pattern Control System Operation

Referring to FIG. 5, the control system essentially comprises three separate data storage and allocation systems (a firing time converter, which incorporates the LUT memory, the "stagger" memory, and the "gatling" memory) operating in a serial sequence. These systems are schematically depicted in FIG. 5. FIG. 8 schematically depicts representative data formats at the process stages indicated in FIG. 5. Each color bar is associated with a respective firing time converter and "stagger" memory, followed by a separate "gatling" memory, arranged in tandem. Each of these major elements will be discussed in turn.

As shown in FIG. 5, the raw pixel codes are sent as prompted by the "start pattern cycle" pulse received from the substrate motion sensor. This sensor merely generates a pulse each time the substrate conveyor moves the substrate a predetermined liner distance (e.g., one-tenth inch) along the path under the patterning color bars. The same "start pattern cycle" pulse is simultaneously sent to each color bar, for reasons which will be explained below.

The raw pixel codes are preferably arranged in strict sequence, with data for applicators 1–480 for the first pattern line being first in the series, followed by data for applicators 1–480 for the second pattern line, etc., as depicted by Data Format B1 of FIG. 8. The complete serial stream of such pixel codes is sent, in identical form and without any color bar-specific allocation, to a firing time converter/memory associated with each respective color bar for conversion of the pixel codes into firing times. This stream of pixel codes preferably comprises a sufficient number of codes to provide an individual code for each dye jet position across the substrate for each pattern line in the overall pattern. Assuming eight color bars of 480 applicators each, a pattern line of 0.1 inch in width (measured along the substrate path), this would require a raw pattern data stream comprised of 288,000 separate codes.

Comprising each firing time converter are the look-up tables described above. The LUT result is sent, in Data Format B2 (see FIG. 8), to the "stagger" memory associated with the given color bar At this point, no attempt has been made to compensate for the physical spacing between color bars or to group and hold the data for sending to the actual air valves associated with each dye jet.

Compensation for the physical spacing between color bars may be best explained with reference to FIGS. 6A and 6B, which functionally describe the individual stagger memories for various color bars in greater detail.

The "stagger" memory operates as follows. The firing time data is sent to an individual random access memory (RAM) associated with each of the eight color bars. Although either static or dynamic RAM's may be used, static RAM's have been found to be preferred because of increased speed. At each color bar, the data is written to the RAM in the order in which it was sent from the look-up table, thereby preserving the jet and color bar identity of the individual firing times. Each RAM preferably has sufficient capacity to hold firing time information for the total number of patterns lines extending from the first to the eighth color bar (as-sumed to be seven hundred for purposes of discussion) for each jet in its respective color bar. In the discussion which follows, it may be helpful to consider the seven hundred pattern lines as being arranged in seven groups of one hundred pattern lines each (to correspond with the assumed inter-color bar spacing).

The RAM's are both written to and read from in a unidirectional repeating cycle, with all "read" pointers being collectively initialized and "lock-stepped" so that corresponding address locations in all RAM's for all color bars are read simultaneously. Associated with each RAM is a predetermined offset value which represents the number of sequential memory address values separating the "write" pointer used to insert the data into the memory addresses and the "read" pointer used to read the data from the RAM address, thereby "staggering" in time the respective read and write operations for a given memory address. As depicted on the left hand side of FIG. 6A, the RAM offset value for the first array is zero, i.e., the "read pattern data" operation is initiated at the same memory address as the "write pattern data" operation, with no offset. The offset for the second color bar, however, is shown as being one hundred, which number is equal to the number of pattern lines or pattern cycles (as well as the corresponding number of read or write cycles) needed to span the distance physically separating the first color bar from the second color bar, as measured along the path of the substrate in units of pattern lines. As depicted, the "read pattern" pointer, initialized at the first memory address location, is found one hundred address locations "above" or "earlier" than the "write" pointer. Accordingly, beginning the "read" operation at a memory address location which lags the "write" operation by one hundred consecutive locations effectively delays the reading of the written data by one hundred pattern cycles to correspond to—and compensate for—the physical spacing between the first and second color bars. To avoid using "dummy" data for the "read" operation until the "read" pointer catches up with the first address written to by the "write" pointer, a "read inhibit" procedure may be used. Such procedure would only be necessary at the beginning and end of a pattern. Alternatively, data representing zero firing time can be loaded into the RAM's in the appropriate address location so that the "read" operation, although enabled, reads data which disables the jets during such times.

The right hand side of FIG. 6A depicts the stagger memory for the eighth color bar. As with all other color bars, the "read" pointer has been initialized to the first memory address in the RAM. The "write" pointer, shown at its initialized memory address location, leads the "read" pointer by an address difference equivalent to seven hundred pattern lines (assuming seven intervening color bars and a uniform inter-color bar spacing of one hundred pattern lines).

FIG. 6B depicts the stagger memories of FIGS. 6A exactly one hundred pattern cycles later, i.e., after the data for one hundred pattern lines have been read. The "read" and "write" pointers associated with color bar 1 are still together, but have moved "down" one hundred memory address locations and are now reading and writing the firing time data associated with the first line of the second group of one hundred pattern lines in the RAM.

The "read" and "write" pointers associated with color 2 are still separated by an offset corresponding to the physical spacing between color bar 1 and color bar 2, as measured in units of pattern lines. Looking at the pointers associated with color bar 8, the "read" pointer is positioned to read the first line of firing time data from the second group of one hundred pattern lines, while the "write" pointer is positioned to write new firing time data into RAM addresses which will be read only after the existing seven hundred pattern lines in the RAM are read. It is therefore apparent the "read" pointer is specifying firing time data which was written seven hundred pattern cycles previously.

The storage registers associated with each color bar's stagger memory store the firing time data for the pattern line to be dyed by that respective color bar in that pattern cycle until prompted by a pulse from the substrate transducer indicating the substrate has traveled a distance equal to the width of one pattern line. At that time, the firing time data, in Data Format B3 (see FIG. 8), is sent to the "gatling" memory for processing as indicated below, and firing time data for the next pattern line is forwarded to the stagger memory for processing as described above.

Associated with each color bar is a set of dedicated first in-first out memory modules (each of which will be hereinafter referred to as a "FIFO"). An essential characteristic of the FIFO is that data is read out of the FIFO in precisely the same order or sequence in which the data was written into the FIFO. The set of FIFO modules must have a collective capacity sufficient to store one byte (i.e., eight bits, equal to the size of the address codes comprising the original pattern data) of data for each of the four hundred eighty diverting air valves in the array. For purposes of explanation, it will be assumed that each of the two FIFO's shown can accommodate two hundred forty bytes of data.

Each FIFO has its input connected to the sequential loader and its output connected to an individual comparator. A counter is configured to send an eight bit incrementing count to each of the comparators in response to a pulse from a "gatling" clock. The "gatling" clock is also connected to each FIFO, and can thus synchronize the initiation of operations involving both the FIFO's and the respective comparators associated with each FIFO. If the smallest increment of time on which "firing time" is based is to be different from color bar to color bar, independent clocks and counters may be associated with each such color bar. Preferably, the output from each comparator may be operably connected to a respective shift register/latch combination, which serves to store temporarily the comparator output data before it is sent to the respective color bar, as described in more detail below. Each comparator output is also directed to a common detector, the function of which shall be discussed below. As indicated in FIG. 8, a reset pulse from the detector is sent to both the "gatling" clock and the counter at the conclusion of each pattern cycle, as will be explained below.

In response to the transducer pulse, the respective stagger memories for each color bar are read in sequence and the data is fed to an color bar-specific sequential loader, as depicted in FIG. 8. The sequential loader sends the first group of two hundred forty bytes of data received to a first FIFO and the second group of two hundred forty bytes of data to a second FIFO. Similar operations are performed simultaneously at other sequential loaders associated with other color bars. Each byte represents a relative firing time or dye contact time (or, more accurately, an elapsed diverting air stream interruption time) for an individual jet in the color bar. After each of the FIFO's for each color bar are loaded, they are simultaneously sent a series of pulses from the "gatling" clock, each pulse prompting each FIFO to send a byte of data (comprised of eight bits) in the same sequence in which the bytes were sent to the FIFO by the sequential loader, to its respective individual comparator. This FIFO "firing time" data byte is one of two separate inputs received by the comparator, the second input being a byte sent from a single counter common to all FIFOs associated with every color bar. This common counter byte is sent in response to the same gatling clock pulse which prompted the FIFO data, and serves as a clock for measuring elapsed time from the onset of the dye stream striking the substrate for this pattern cycle. At each pulse from the gatling clock, a new byte of data is released from each FIFO and sent to its respective comparator.

At each comparator, the eight bit "elapsed time" counter value is compared with the value of the eight bit "firing time" byte sent by the FIFO. The result of this comparison is a single "fire/no fire command" bit sent to the shift register as well as the detector. If the FIFO value is greater than the counter value, indicating the desired firing time as specified by the pattern data is greater than the elapsed firing time as specified by the counter, the comparator output bit is a logical "one" (interpreted by the array applicators as a "fire" command). Otherwise, the comparator output bit is a logical "zero" (interpreted by the array applicators as a "no fire" or "cease fire" command). At the next gatling clock pulse, the next byte of firing time data in each FIFO (corresponding to the next individual jet along the array) is sent to the respective comparator, where it is compared with the same counter value. Each comparator compares the value of the firing time data forwarded by its respective FIFO to the value of the counter and generates a "fire/no fire" command in the form of a logical one or logical zero, as appropriate, for transmission to the shift register and the detector.

This process is repeated until all two hundred forty "firing time" bytes have been read from the FIFO's and have been compared with the "elapsed firing time" value indicated by the counter. At this time, the shift resister contains a serial string of two-hundred and forty logical ones and zeros that correspond to firing commands. These firing commands are forwarded in parallel format to a latch. The latch serves to transfer, in parallel, the firing commands from the shift register to the individual air valves associated with the color bar dye applicators at the same time the shift register accepts a fresh set of two hundred forty firing commands for subsequent forwarding to the latch. Each time the shift register forwards its contents to the latch (in response to a clock pulse), the counter value is incremented. Following this transfer, the counter value is incremented by one time unit and the process is repeated, with all two hundred forty bytes of "firing time" data in each FIFO being reexamined and transformed into two hundred forty single bit "fire/no fire" commands, in sequence, by the comparator using the newly incremented value of "elapsed time" supplied by the counter.

The above process, involving the sequential comparison of each FIFO's entire capacity of firing time data with each incremented "elapsed time" value generated by the counter, is repeated until the detector determines that all comparator outputs for that color bar are a logical "zero". This indicates that, for all jets in the color bar, no desired firing time (represented by the FIFO values) for any jet in the color bar exceeds the elapsed time then indicated by the counter. When this condition is sensed by the comparator, it indicates that, for that pattern and that color bar, all required patterning has occurred. Accordingly, the detector sends "reset" pulses to both the counter and to the gatling clock. The gatling module then waits for the next substrate transducer pulse to prompt the transmission and loading of firing time data for the next pattern line by the sequential loader into the FIFO's, and the reiterative reading/comparing process is repeated as described above.

Diagnostics Bypass Circuitry

Referring to FIG. 9, there is shown in greater detail a schematic block diagram of the bypass logic 7 shown generally in FIG. 4. FIG. 9 shows the associated bypass logic for one of the color bars in the jet dyeing apparatus 18. It should be understood that the same bypass logic is required for each of the color bars in the apparatus. The bypass logic circuitry 7 permits selective bypassing of either the look-up tables 54, stagger memory 56 or both the look-up tables 54 and stagger memories 56. This allows test patterns input over the DATA IN line 44 during a diagnostic check of the system to selectively bypass certain of the components in the control system to isolate the occurence of any errors detected.

A first bypass line 81 couples 8-bit pattern data from line 44 into a bus driver 90. Coupled after and receiving the output from the look-up table 54 is another bus driver 92 which provides its output to the stagger memory 56. Bus drivers 90 and 92 have their outputs coupled in parallel and fed to the input of stagger memory 56. Bus drivers 90 and 92 further receive enabling signals via the mode register 88.

Similar bypass circuitry is utilized with stagger memory 56 including bus drivers 94 and 96 and bypass line 85.

Under normal operation, the control system for each color bar operates as described above with bus drivers 92 and 96 permitting the respective pattern data to flow through each driver. During diagnostic operation, the test pattern supplied over DATA IN line 44 is permitted to pass through each of the components 54, 56 and 58 and the in-line bus drivers 92 and 96. However, when an error is detected, it may be necessary to isolate which component, e.g., look-up table 54 or stagger memory 56 that caused the error. When attempting to isolate an error, the mode register 88 enables one or both of the bypass lines 81 or 85 depending upon the 16 bits of data loaded into the mode register 88 from the real-time computer 10.

In a preferred embodiment, each of the 16 bits loaded into mode register 88 designates a particular mode or functioning of the pattern control system 16. Thus, when the system sofware operating on the real-time computer 10 initiates a bypass of one or both of the control system components, the mode register 88 receives the 16-bit data having particular bits set. A signal is then sent from the mode register 88 to enable the bypass selected.

In isolation operation, the mode register 88 provides a signal which enables the bypass bus driver and disables the driver coupled in series between a component to be bypassed and the next component to receive the pattern data. For example, if the look-up tables 54 are to be bypassed, then the signal from the mode register 88 disables bus driver 92 and enables bus driver 90. Thus, the data provided on line 44 flows through bypass line 81, bus driver 90 and is input into the stagger memory 56. A similar operation occurs for bypassing the stagger memory 56 by enabling bus driver 94 and disabling bus driver 96. Likewise, to bypass both the look-up tables 54 and stagger memory 56, bus drivers 90 and 94 are enabled via a signal from the mode register 88 and bus drivers 92 and 96 are disabled.

A unique advantage of the bypass feature is that it allows the test pattern data to be input directly to the gatling memory 58 thus avoiding the time delays inherent with the operation of the stagger memory 56 as described above. The diagnostic check being performed can therefore be performed more efficiently than if the test had to wait for the stagger memory 56 to compensate for the downstream color bars. In normal day to day production operation, this technique allows the checking of jets and flows without having to wait for the stagger memory to compensate for the downstream color bars.

LUT Diagnostics

Referring to FIG. 10, there is shown a block diagram of the look-up tables 54 associated with a single color bar as described with respect to FIG. 4. It should be understood the same number of look-up tables are associated with each and every color bar in the jet dyeing apparatus.

FIG. 10 shows look-up tables 1 through 512 associated with color bar 1. The look-up tables receive input data over line 44 and output firing time data over lines 103–105. As described above, it is apparent that only one of the 512 look-up tables are used for each pattern and hence only one firing time output line 103–105 will be in use at any given time. The look-up table which is used for the pattern is selected by the look-up table select register 46 shown and described above with respect to FIG. 4.

During a diagnostic check of the look-up tables, it is necessary to assure that the address lines operate properly, i.e., the address lines are capable of correctly specifying each unique address within each single look-up table among a group of look-up tables. To perform this check, the system software operating on the real-time computer 10 outputs look-up table loading data in a "prime number pattern". In a preferred embodiment, the prime number pattern is selected to be the largest prime number less than the number of the addresses in each of the look-up tables. Hence, in our example, assuming each of the 512 look-up tables include 256 addresses, the prime number pattern uses the prime number 251. The system software generates a loading pattern having 251 different pieces of data. This pattern is repeated to fill up each of the look-up tables for each of the color bars.

As shown in FIG. 10, look-up table 1 is loaded with data 0–250 in its first 250 addresses and loaded with data 0 through 4 in addresses 251–255. Continuing, look-up table 2 is loaded with data 5–250 in addresses 0–245 and with data 0–8 in addresses 246–255. The system continues to load all available addresses in each of the 512 look-up tables in sequence with the same prime number pattern stream from the real-time computer 10, i.e., look-up table 1 is loaded in address 0–250 and then is loaded with the same repeating sequence data in locations 251–255, with the remaining portion of the 251 address-length prime number pattern stream being loaded into location 0–245 of the second look-up table, etc.

Accordingly, upon inputting (i.e., selecting an address within the look-up table) a "count pattern", i.e., the sequence of binary numbers 0,1,2, . . . 255, the output of the look-up table is the respective sequence of 0,1,2, . . . 251, 0,1,2,3,4. While a "prime number pattern" is preferred, it is believed that any positive non-zero integer that is not a integral power of two (and can be accommodated within the memory) can be used in this diagnostic check.

Once all of the look-up tables have been preloaded, then the system reads each address of the look-up tables (as discussed in connection with FIG. 4, above) and forwards the firing time data over lines 103–105 to comparator 102. This is accomplished by real time computer 10, by first selecting look-up table 1 and outputting to that LUT the count pattern over bus 44, then selecting, in turn, look-up tables 2,3, etc. and outputting to those respective look-up tables the same count pattern. At the same time, the system enables an erasable programmable read only memory (EPROM) by setting the appropriate bits on mode register 88. The EPROM has stored thereon the same prime number pattern as was loaded into the look-up tables, as described above. Each byte of pattern data output by the computer 10 on bus 44, via bus 22, and multiplexed by multiplexer 48, is placed on the lower address lines of the selected look-up table. The LUT in turn outputs its contents to comparator 102, via the various lines 103–105. At the same time, EPROM 100 outputs the correspondingly numbered byte to comparator 102. The comparator 102 may be of any conventional 8-bit type of comparator such as those produced by Signetics Corporation. The resulting output from the comparator 102 on line 106 reflects the coincidence of the two inputs and therefore confirms the lack of any errors in the contents of the look-up tables. It can be readily understood that by using a prime number pattern to load the look-up tables, each address location for each look-up table will have a different piece of data. This insures that any address lines causing incorrect addressing (e.g., electrically shorted or open) can be determined.

Firing Time Diagnostic

Referring back to the gatling memory shown in FIG. 7, it is often necessary to test for proper operation of each of the FIFOs by insuring that each bit in the FIFO can produce a unique firing time.

FIG. 11 shows one of the FIFOs used in the gatling memory 58. The FIFO is preferably at least a 240×8 bit FIFO which receives 240 bytes from the sequential loader (FIG. 7). Each byte stored in the FIFO represents an increment of time as determined by the gatling clock described above with respect to FIG. 7. The output from the FIFO eventually is sent as a serial stream of logical ones or zeros to the dye jet valve in the color bar. Each bit in the FIFO is checked by the diagnostic system controlled by real-time computer 10. The diagnostic system simulates a speed-up of the jet dyeing apparatus conveyor operation (by changing the contents of the simulate divisor register 84 of FIG. 4) and then checks for the onset of machine "optimum speed" and machine "over-speed". These speeds are based upon the requested firing time and the operating limitations of the dye jet and will more fully be described with respect to FIGS. 11 and 12.

FIG. 12A is a timing diagram showing the firing time for a single dye jet in one of the color bars with respect to the conveyor operating speed. Two complete cycles of operation are shown in FIG. 12A wherein the dye jet has a firing time, FT, equal to 4 ms and the substrate has a travel time of 10 milliseconds (MS) per pattern line. An additional "analog" time period of 0.7 ms is shown appended to the firing time of 4 ms of FIG. 12. This analog time represents the valve actuation or response time, i.e., the time period necessary to physically open or close the dye jet valve. It should be understood that 0.7 ms is only an example and that the analog time period may be greater or lesser depending upon the sophistication of the valve technology. The further shaded area adjacent to the analog time period represents a preferred operating area in which the next cycle of operation should begin. This preferred area is representing a duration of 0.3 ms. Again, the determination of the preferred area time period is arbitrarily based upon the efficiency required from the apparatus.

As shown in FIGS. 12B–12E, when the conveyor operating speed is increased, the beginning of the next cycle of operation moves closer to the preferred operating area. Further increases in conveyor speed eventually brings the next cycle into the analog time period area. FIG. 12B shows that with an increased substrate travel time of 5 ms per pattern line (as opposed to the 10 ms speed in FIG. 12A), the beginning of the next cycle occurs immediately following the preferred operating area. FIG. 12C shows the next cycle beginning in the preferred operating area with a machine speed of 4.9 ms per pattern line. The 4.9 ms per pattern line machine speed would therefore be within the "optimum speed" range. Likewise, FIG. 12D shows that machine speed of 4.8 ms per pattern line is also within the optimum speed range. FIG. 12E, however, shows the next cycle of operation beginning within the analog time period. Because of valve actuation or response time limitations, the accuracy of the subsequent cycles' firing time cannot be guaranteed. Thus, the 4.4 ms per pattern line machine speed shown in FIG. 12E is defined as machine "overspeed".

It should be noted that by knowing the firing time, analog time, and preferred area time, the optimum speed and overspeed for the machine can be determined. By summing the firing time and the analog time period, the reciprocal thereof determines the machine speed in pattern lines per second. The control system detects when optimum speed and overspeed occurs and generates signals indicating when the machine is operating at these speeds. These signals are fed into real-time computer 10 such that the real-time diagnostic software is made aware of these conditions as they occur.

Referring back to FIG. 11, each of the FIFOs in the gatling memories (FIG. 7) can be tested by individually setting each bit in a selected location in the FIFO and simulating the occurrence of optimum speed and overspeed through the use of the control system.

The diagnostic for the FIFOs operates through the software in the real-time computer 10 (FIG. 4) which controls the simulator divider 84. This register is used to simulate movement of the conveyor. The simulator divider 84 may be of the oscillator-type wherein the 16-bits received over line 22 from the real-time computer determines an oscillating frequency. The oscillating frequency simulates transducer pulses indicating substrate travel.

An example of the diagnostic operation, assuming the gatling is set to provide 0.2 ms increments, is given with reference to FIGS. 11 and 12 A–12E. The FIFO output from location 4 provides an 8-bit value having only a single bit set for testing purposes. This byte, "00001000", represents in binary form the decimal numeral "8" which, when multiplied by the gatling clock time period of 0.2 ms, results in a firing time of 4 ms as shown in FIGS. 12A–12E. Assuming a 0.7 ms analog time period and a 0.3 ms "preferred area", the system software can determine the onset of overspeed from the following equation.

Onset of Optimum Speed = 4.0 ms/pattern line + 0.7 ms + 0.3 ms/pattern line
= 5.0 ms/pattern line Onset of Overspeed = 4.0 ms + 0.7 ms
= 4.7 ms/pattern line Overspeed > Onset of Overspeed Onset of Overspeed > Optimum Speed >

Onset of Optimum Speed

Overspeed will thus occur if the conveyor operates at a speed greater than 4.7 ms per pattern line (onset of overspeed). The system thus operates the simulator divider 84 to simulate an increased conveyor speed up to 4.7 ms per pattern line. As the conveyor speed approaches the 4.7 ms per pattern line speed, a signal is generated indicating that the optimum speed range has been reached. Once the simulated conveyor speed equals or becomes greater than 4.7 ms per pattern line, an overspeed signal occurs. In this manner, by individually setting each bit in the FIFO (FIG. 11), the system can determine whether the bit was properly set by checking whether the onset of optimum speed and the onset of overspeed occur at the proper machine speed.

In a preferred embodiment, each FIFO is actually a set of two FIFOs, mounted in paired relation so that, while data is being read from one FIFO set, data may be written to the second member of the pair. The system software checks four machine speeds for each FIFO paired set across the width of the color bar. The system software also checks each individual FIFO in each paired set, for each color bar, using eight different firing times (which checks each bit). The system software outputs one firing time per line of data (the rest of the line contains zeros) on every other line so that only one FIFO of each FIFO set is checked at a time. While outputting this line (done every other line), the software begins to increase the simulated machine speed. First the software sets the simulated machine speed to just below the speed required to produce "optimum speed" and verifies that the "optimum speed" condition does not occur. The software then increases the simulated machine speed to just above the speed required to produce "optimum speed" and verifies that the "optimum speed" condition occurs. The software then increases the simulated machine speed to just below the threshold of the "overspeed" condition, and verifies that only the "optimum speed" condition is occurring. The simulated machine speed is then increased to the onset of the "overspeed" condition; this condition is verified. The software then proceeds to check the other side of the gatling RAM pair (to check the other side of the FIFO set), then goes to the next gatling RAM pair (across the width of the color bar), then proceeds to the next color bar, etc. until all gatling RAM's have been checked. It has been found that the firing time diagnostic dramatically increases assurances that all the hardware is operating properly.

What is claimed is:

1. A diagnostic method for checking a plurality of address lines associated with each of a plurality of look-up tables in a pattern control system used in a textile dyeing apparatus, the method comprising the steps of:

a) determining the number of said plurality of address lines for each of the look-up tables;

b) repeatedly generating a sequence of look-up table data, said sequence having a length equal to the largest prime number less than the number of address lines for each of the look-up tables, and each piece of data in said sequence being individually unique;

c) storing said sequence of look-up table data in a memory;

d) loading in sequence a first of said look-up tables from its first address linen to its last address line with the sequence of look-up table data; said sequence of look-up table data repeating for those address lines greater than the prime number and less than or equal to the number of address lines in the look-up table;

e) loading the next of said look-up tables from its first address line to its last address line with the repeating sequence of data, said first address line of the second look-up table receiving the next piece of data in the sequence data not loaded into the previous look-up table;

f) repeating step (e) for all of said plurality of look-up tables;

g) generating a count pattern to address in order each of said address lines of each of said look-up tables and providing the contents thereof as a series of outputs; and h) comparing said series of outputs with the stored sequence of look-up table data to determine the coincidence of said series of outputs and the stored sequence of look-up table data.

2. A diagnostic method for checking a plurality of address lines associated with each of a plurality of look-up tables in a pattern control system used in a textile dyeing apparatus, the method comprising:

(a) repeatedly generating a sequence of look-up table data, said sequence having a length, and each piece of data in said sequence being individually unique;

(b) storing said sequence of look-up table data in a memory;

(c) loading sequentially a first of said look-up tables from its first address line onward with the sequence of lookup table data, said sequence of look-up table data repeating for those address lines greater than the length of said sequence of look-up table data and less than or equal to the number of address lines in said first look-up table;

(d) loading the next of said look-up tables from first address line onward with the repeating sequence of data, whereby said first address line of said next look-up table receiving the next look-up table data in the sequence not loaded into the previous look-up table;

(e) repeating step (d) for all of said address lines of said plurality of look-up tables;

(f) preloading a separate memory with the stored sequence of look-up table data;

(g) generating a count pattern to address, in order, each of said address lines of each of said look-up tables and providing the contents thereof as a series of outputs; and (h) comparing said series of outputs with the stored sequence of look-up table data to determine the coincidence of said series of outputs and the stored sequence of look-up table data.

3. The method of claim 2, wherein before step (a):

determining the number of said plurality of address lines for each of said look-up tables, whereby said length is equal to the largest prime number less than the number of address lines for each of the look-up tables.

4. A diagnostic method for checking a plurality of gatling memories associated with the firing times in a pattern control system used in a textile dyeing apparatus, the method comprising:

(a) setting one of a plurality of bits in a selected location of a First-In-First-Out memory of the gatling memories, whereby each of said bits corresponds to a unique firing time;

(b) determining an optimum speed onset value by adding to said firing time an analog time value, which corresponds to a valve actuation time in the dyeing apparatus, and a preferred operating time value;

(c) determining an overspeed onset value by adding to said firing time said analog time value;

(d) setting a speed simulator to a set an artificial firing time greater than said optimum speed onset value;

(e) decreasing said artificial firing time stepwise to a value less than said overspeed onset value;

(f) detecting in said control system optimum speed and overspeed conditions in said dyeing apparatus;

(g) generating signals in said control system corresponding to said optimum speed and overspeed conditions; and (h) comparing said optimum speed and overspeed condition signals to said optimum speed onset value and said overspeed onset value, whereby discrepancies between said onset values and said condition signals indicate whether bits in said First-In-First-Out memory are properly set.

5. The method of claim 4, further comprising:

(i) repeating steps (a) through (h) for each bit in said First-In-First-Out memory.

6. The method of claim 5, further comprising:

(j) repeating steps (a) through (i) for each gatling memory in said control system.

7. The method of claim 6, wherein each of said gatling memories comprises a pair of said First-In-First-Out memories, whereby only one of said pair is checked at one time.

* * * * *